United States Patent [19]

Baumstark et al.

[11] Patent Number: 5,756,574
[45] Date of Patent: May 26, 1998

[54] PROCESS FOR PREPARING AN AQUEOUS POLYMER DISPERSION

[75] Inventors: Roland Baumstark, Neustadt; Robert Rupaner, Ludwigshafen, both of Germany

[73] Assignee: BASF Aktiengesellschaft, Ludwigshafen, Germany

[21] Appl. No.: 809,601

[22] PCT Filed: Sep. 23, 1995

[86] PCT No.: PCT/EP95/03770

§ 371 Date: Apr. 3, 1997

§ 102(e) Date: Apr. 3, 1997

[87] PCT Pub. No.: WO96/10588

PCT Pub. Date: Apr. 11, 1996

[30] Foreign Application Priority Data

Oct. 4, 1994 [DE] Germany .......... 44 35 422.3

[51] Int. Cl.$^6$ ............................... C08F 2/16
[52] U.S. Cl. .................. 524/460; 524/458; 524/723; 524/819; 524/820; 524/821; 524/822; 524/823; 524/824; 524/828; 524/829; 524/831; 524/832; 524/827; 524/833; 524/804; 526/220
[58] Field of Search .................. 524/827, 819, 524/820, 824, 831, 832, 833, 829, 458, 460, 723, 804, 821, 822, 823, 828; 526/220

[56] References Cited

U.S. PATENT DOCUMENTS

| | | | |
|---|---|---|---|
| 3,165,500 | 1/1965 | Logemann et al. | 526/220 |
| 3,179,613 | 4/1965 | Guenther et al. | 526/220 |
| 3,344,128 | 9/1967 | Uraneck . | |
| 3,870,673 | 3/1975 | Rauterkus et al. | 526/304 |
| 4,147,845 | 4/1979 | Peterson . | |
| 4,244,690 | 1/1981 | Sato et al. | 80/465 |
| 4,426,501 | 1/1984 | Khan | 526/209 |
| 4,529,753 | 7/1985 | Taylor . | |
| 4,678,848 | 7/1987 | Walter | 526/220 |
| 4,786,698 | 11/1988 | Musch et al. . | |
| 4,839,447 | 6/1989 | Casper et al. . | |
| 4,975,501 | 12/1990 | Musch et al. . | |
| 5,021,469 | 6/1991 | Landerbeins et al. . | |
| 5,087,676 | 2/1992 | Heider et al. . | |
| 5,376,703 | 12/1994 | Noelken et al. . | |
| 5,408,019 | 4/1995 | Mertens et al. . | |
| 5,414,193 | 5/1995 | Taylor et al. . | |
| 5,453,485 | 9/1995 | Huth et al. . | |

FOREIGN PATENT DOCUMENTS

| | | | |
|---|---|---|---|
| 1332485 | 2/1989 | Canada . | |
| 0014083 | 8/1980 | European Pat. Off. | 524/827 |
| 0 155 805 B1 | 3/1985 | European Pat. Off. . | |
| 0 327 006 B1 | 1/1989 | European Pat. Off. . | |
| 0 379 892 A3 | 1/1990 | European Pat. Off. . | |
| 0 505 959 A3 | 3/1992 | European Pat. Off. . | |
| 0 530 468 A3 | 7/1992 | European Pat. Off. . | |
| A 0 505 163 | 9/1992 | European Pat. Off. . | |
| 0 584 458 A3 | 5/1993 | European Pat. Off. . | |
| 30 06 172 A1 | 2/1980 | Germany . | |
| 36 05 331 A1 | 2/1986 | Germany . | |
| 36 05 332 A1 | 2/1986 | Germany . | |
| 36 05 334 A1 | 2/1986 | Germany . | |
| 38 34 734 A1 | 10/1988 | Germany . | |
| 39 09 790 A1 | 3/1989 | Germany . | |
| 40 15 085 C2 | 5/1990 | Germany . | |
| 42 10 208 A1 | 3/1992 | Germany . | |

OTHER PUBLICATIONS

AMA 142–143 Ambenoniumchlorid.

24. Datum des Patentblattes: 9.4.53, Bestell–Nr. o4345/53, pp. 1–4.

*Primary Examiner*—Judy M. Reddick
*Attorney, Agent, or Firm*—Oblon, Spivak, McClelland, Maier & Neustadt, P.C.

[57] ABSTRACT

A process for the preparation of an aqueous polymer emulsion, in which an aqueous emulsion of a polymer which contains at least one chemically bonded monomer having at least one ethylenically unsaturated group is produced in a manner known per se so that the total content of free monomers having at least one ethylenically unsaturated double bond, ie. monomers of this type which are not chemically bonded, in the aqueous polymer emulsion is from >0 to ≦1% by weight, based on the polymer content of the aqueous polymer emulsion, and this residual monomer content is then reduced by the action of a free radical redox initiator system comprising at least one oxidizing agent and at least one reducing agent, wherein the redox initiator system comprises, as the reducing agent, one which is present, in aqueous solution, in at least two tautomeric forms in equilibrium with one another (for example aminoiminomethanesulfinic acid and/or the salts thereof).

30 Claims, No Drawings

PROCESS FOR PREPARING AN AQUEOUS POLYMER DISPERSION

BACKGROUND OF THE INVENTION

1. Field of the Invention

The present invention relates to a process for the preparation of an aqueous polymer emulsion, in which an aqueous emulsion of a polymer which contains at least one chemically bonded monomer having at least one ethylenically unsaturated group is produced in a manner known per se so that the total content of free monomers having at least one ethylenically unsaturated double bond, ie. monomers of this type which are not chemically bonded (referred to in this publication as content of residual monomers or residual monomer content), in the aqueous polymer emulsion is from >0 to ≦1% by weight, based on the polymer content of the aqueous polymer emulsion, and this residual monomer content is then reduced by the action of a free radical redox initiator system comprising at least one oxidizing agent and at least one reducing agent.

2. Description of the Background Art

Aqueous polymer emulsions are fluid systems which contain polymer particles present in stable disperse form as the disperse phase in an aqueous dispersing medium. The diameter of the polymer particles is in general mainly from 0.01 to 5 µm, frequently mainly from 0.01 to 1 µm. The stability of the disperse phase often extends over a period of ≧1 month, frequently even over a period of ≧3 months. The proportion by volume of the polymer in the aqueous polymer emulsion is normally from 10 to 70% by volume, based on the total volume of the aqueous polymer emulsion.

As in the case of polymer solutions when the solvent is evaporated, aqueous polymer emulsions have the property of forming polymer films when the aqueous dispersing medium is evaporated, and said emulsions are therefore widely used as binders, for example for surface coatings or materials for coating leather.

In principle, a person skilled in the art categorizes aqueous polymer emulsions as aqueous secondary emulsions and aqueous primary emulsions. The aqueous secondary emulsions are those in the preparation of which the polymer is produced outside the aqueous dispersing medium, for example in solution in a suitable non-aqueous solvent. This solution is then transferred to the aqueous dispersing medium and the solvent is separated off, as a rule by distillation, with dispersing. In contrast, aqueous primary emulsions are those in which the polymer is produced in the aqueous dispersing medium itself and is present immediately as a disperse phase. The common feature of all preparation processes is essentially that monomers which have at least one ethylenically unsaturated group are concomitantly used for synthesizing the polymer, or that this synthesis is effected exclusively from such monomers.

Incorporation of such monomers having at least one ethylenically unsaturated group is usually carried out by an initiated polymerization reaction, the type of initiation being determined in particular by the desired performance characteristics of the end product and therefore being adapted to these. For example, ionic or free radical initiation is suitable. However, the incorporation may also be effected by catalytically initiated polymer-analogous reaction. Free radical initiation is particularly frequently used and hence the incorporation of the one or more monomers having at least one ethylenically unsaturated group is carried out as a rule by the free radical aqueous emulsion polymerization method in the case of aqueous primary emulsions and as a rule by the free radical solution polymerization method in the case of aqueous secondary emulsions.

Since, when the required periods are taken into account, it is generally not useful to attempt to achieve complete conversion with regard to the incorporation of the one or more monomers having at least one ethylenically unsaturated group while maintaining the actual polymerization reaction conditions determining the desired properties (for example molecular weight, molecular weight distribution, degree of branching, etc.) of the end product, the aqueous polymer emulsions resulting after the end of this main polymerization reaction usually contain free monomers which have at least one ethylenically unsaturated double bond and are not incorporated by chemical bonding in the dispersed polymer. Owing to the high reactivity of the ethylenically unsaturated double bond, such residual monomers, for example acrylonitrile and vinyl acetate, are not completely toxicologically safe and are therefore undesirable from the point of view of both the producer and the consumer.

A very wide range of methods is already available for reducing the residual monomer content of aqueous polymer emulsions.

EP-A 584 458 discloses that the residual monomer content of aqueous polymer emulsions can be reduced by stripping by means of steam. EP-B 327 006 recommends the use of conventional distillation.

These processes are disadvantageous in that they are capable of reducing the residual monomer content of the aqueous polymer emulsion but do not deal with the disposal of the residual monomers. The latter problem is merely shifted to another level.

In addition, their use generally gives rise to changes in the solids content of the aqueous polymer emulsion and adverse effects on the stability of the disperse phase.

EP-A 505 959 relates to a process for reducing the content of vinyl acetate in aqueous polyvinyl acetate emulsions. In the process of EP-A 505 959, the residual monomeric vinyl acetate is hydrolyzed in a weakly alkaline medium to give acetic acid and acetaldehyde, the latter being oxidized to acetic acid by added hydrogen peroxide. However, the disadvantage of this procedure is that it adversely affects the stability of the aqueous polymer emulsion owing to an additional electrolyte load.

DE-A 42 10 208 relates to a process for reducing the content of free vinyl acetate and vinyl propionate in aqueous polymer emulsions. The process essentially corresponds to a combined use of stripping and hydrolysis of these monomers, and the disadvantages of the abovementioned procedures therefore also apply to the process of DE-A 42 10 208.

DE-A 30 06 172 relates to a process for reducing the content of free acrylonitrile in aqueous polymer emulsions. In this procedure, additional monomers which have a pronounced tendency to undergo free radical copolymerization with acrylonitrile are added to the aqueous polymer emulsion, and the main free radical polymerization reaction is continued.

DE-A 38 34 734, EP-A 379 892 and EP-A 327 006 disclose that the content of residual monomers in aqueous polymer emulsions can be reduced by means of free radical postpolymerization after the end of the main polymerization reaction, by the action of particular free radical redox initiator systems which for various reasons are often less suitable for the main polymerization. Such redox initiator systems comprise at least one oxidizing agent, at least one reducing agent and, if required, one or more transition metal ions occurring in various valency states. Here, the reducing agent plays a key role with regard to the postpolymerization activity of the free radical redox initiator system in aqueous polymer emulsions. Said reducing agent should in particular be such that, when it is used in a redox initiator system for the purpose of free radical postpolymerization in aqueous polymer emulsions, the stability of the disperse phase in the aqueous polymer emulsion is essentially unaffected, the redox initiator system displays its advantageous effect in particular at a pH of the aqueous dispersing medium of from $\geq 6$ to 10, preferably from 7 to 9, since the vast majority of all aqueous polymer emulsions are anionically stabilized, the concomitant action of a transition metal ion is not essential since the latter remains in the aqueous polymer emulsion after the end of the postpolymerization, as far as possible no undesirable volatile secondary products are produced and essentially no discoloration of the films of the aqueous polymer emulsion results.

U.S. Pat. No. 4 529 753, columns 3 and 4, recommends reducing sugars and their acid derivatives, for example ascorbic acid and alkali metal bisulfite, as reducing agents which are suitable in free radical redox initiator systems for the purpose of free radical postpolymerization in aqueous polymer emulsions, sodium disulfite being singled out as a particularly suitable reducing agent. EP-B 327 006, page 7, supports this recommendation in U.S. Pat. No. 4 529 753 and mentions sulfoxylates, such as the sodium salt of hydroxymethanesulfinic acid (Rongalit® C), as further appropriately suitable reducing agents. A redox initiator system comprising Rongalit C is also used in Example 1 of EP-A 379 892 and in DE-A 38 34 734 for the purpose of free radical postpolymerization in an aqueous polymer emulsion.

However, the disadvantage of these reducing agents recommended in the prior art is that they do not fully meet the requirements described above.

Another disadvantage of the reducing agents recommended in the prior art is that they must be used in combination with oxidizing agents which have a high oxidation potential. If small amounts of such oxidizing agents remain in the aqueous polymer emulsion, they have an adverse effect on, for example, the treatment of said emulsion with preservatives, since biocides are generally extremely sensitive to oxidizing agents having a high oxidation potential (cf. for example L. Conquer in Polymer Paint Col. J. Vol. 183, No. 4335 (1993), 421–423).

Furthermore, according to F. Hölscher, Dispersionen synthetischer Hochpolymerer, Part I, Springer-Verlag, New York (1969), page 117, residues of oxidizing agent, for example in the case of peroxide oxidizing agents, have an adverse effect on the performance characteristics of the dispersion system.

U.S. Pat. No. 4 529 753 recommends the simultaneous use of the postpolymerization procedure and the procedure involving stripping with steam, so that this recommendation too has the disadvantages already described.

Moreover, while it is usually possible to achieve residual monomer contents of 1% by weight or less, based on the polymer content of the aqueous polymer emulsion, using the prior art processes for the reduction of the residual monomer content of aqueous polymer emulsions, increasing difficulties are encountered in decreasing the residual monomer content below the 1% by weight limit. These are presumably due to the fact that both the dispersed polymer particles and the aqueous dispersing medium are available as a possible location for the residual monomers in an aqueous polymer emulsion. A distribution equilibrium is established between these two phases. The disadvantage of the known methods for reducing the residual monomer content of aqueous polymer emulsions appears to be based on the fact that they essentially apply either only to the aqueous dispersing medium or only to the polymer particles. Consequently, a significant total reduction of the residual monomer content of the aqueous polymer emulsion will be essentially diffusion-controlled (repeated establishment of the distribution equilibrium), and this is presumably responsible for the unsatisfactory rate of residual monomer reduction in aqueous polymer emulsions when the known processes are used.

The possibility of distribution between two different phases is presumably also a reason why the residual monomer reduction in aqueous polymer emulsions by the prior art processes does not take place uniformly for the different residual monomers in the case of a residual monomer mixture which comprises at least two different monomers A and B whose difference as a rule also results in different solubilities thereof both in the aqueous dispersing medium and in the dispersed polymer particles.

OBJECTS OF THE INVENTION

It is an object of the present invention to provide a process for reducing the residual monomer content of an aqueous polymer emulsion by the action of a free radical redox initiator system comprising at least one oxidizing agent and at least one reducing agent, which process does not have the disadvantages of the known processes for reducing the residual monomer content of aqueous polymer emulsions.

SUMMARY OF THE INVENTION

We have found that this object is achieved by a process for the preparation of an aqueous polymer emulsion, in which an aqueous emulsion of a polymer which contains at least one chemically bonded monomer having at least one ethylenically unsaturated group is produced in a manner known per se so that the total content of free monomers having at least one ethylenically unsaturated double bond, ie. monomers of this type which are not chemically bonded, in the aqueous polymer emulsion is from >0 to $\leq 1\%$ by weight, based on the polymer content of the aqueous polymer emulsion, and this residual monomer content is then reduced by the action of a free radical redox initiator system comprising at least one oxidizing agent and at least one reducing agent, wherein the redox initiator system comprises, as the reducing agent, a compound which, in aqueous solution, is present in at least two tautomeric forms in equilibrium with one another, preferably aminoiminomethanesulfinic acid and/or the salts thereof. Of course, the novel process can also be used in the range of residual monomer contents from $10^{-3}$ to 0.5% by weight or from $10^{-3}$ to 0.1% by weight, based on the polymer content of the aqueous polymer emulsion.

The following prior art may be used as a basis for achieving the object of the invention.

Römpp, Chemie Lexikon, Cm-G, 9th Edition, Georg Thieme Verlag, Stuttgart (1990), page 1426, discloses that aminoiminomethanesulfinic acid is present in aqueous solution in two forms in equilibrium with one another (tautomerism):

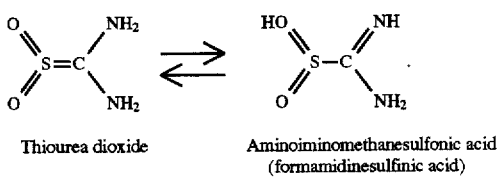

Thiourea dioxide     Aminoiminomethanesulfonic acid
(formamidinesulfinic acid)

Degussa AG markets the substance as reducing agent F for the textile industry.

German Patent Application F 2886 (1944) of Farbf. Bayer discloses that aminoiminomethanesulfinic acid in the presence of oxygen is capable of initiating free radical aqueous main emulsion polymerizations. 60, 80 and 100% yields (Example 6) are reported in the examples. Our reworking of Example 6 gave a polymerization conversion of 5%, based on monomer to be polymerized.

U.S. Pat. No. 3 344 128 recommends the use of aminoiminomethanesulfinic acid as a reducing agent in redox initiator systems which initiate the free radical aqueous main emulsion polymerization of conjugated dienes and mixtures of conjugated dienes and vinylaromatics. The reported polymerization conversions are all below 70%.

JP 60/118706 relates to the free radical aqueous main emulsion polymerization for the preparation of chloroprene polymers in the presence of aminoiminomethanesulfinic acid. The polymerization conversion achieved is 70%. The residual monomers are removed by stripping with steam.

DE-A 36 05 331 likewise relates to the free radical aqueous main emulsion polymerization of chloroprene. The redox initiator systems recommended include those which comprise aminoiminomethanesulfinic acid. From 50 to 99% are mentioned as possible monomer conversions in the description. In the exemplary embodiments, the monomer conversion is <70% in all cases. Very generally, this publication recommends the removal of unconverted organic compounds by steam distillation during the free radical aqueous main emulsion polymerization. A corresponding procedure is adopted in the examples.

EP-B 155 805 also relates to the free radical aqueous main emulsion polymerization for the preparation of chloroprene polymers. The examples are carried out under a nitrogen atmosphere and include the concomitant use of aminoiminomethanesulfinic acid. EP-B 155 805 gives no indication of the concomitant use of an oxidizing agent. Furthermore, the polymerization conversions based on chloroprene are limited to ≦95% in all examples. EP-B 155 805 recommends stripping by means of steam to eliminate the unconverted monomers.

The disclosures of DE-A 36 05 334 likewise include the free radical aqueous main emulsion polymerization of chloroprene using free radical redox initiators containing aminoiminomethanesulfinic acid. The monomer conversions usually achieved are stated as from 63 to 85%. The use of steam distillation is recommended for eliminating unconverted organic compounds.

DE-A 36 05 332 also relates to the free radical aqueous main emulsion polymerization of chloroprene. The recommended free radical redox initiator systems also include those which contain aminoiminomethanesulfinic acid. From 50 to 99% are mentioned as possible monomer conversions in the description. The monomer conversions are limited to <70% in all cases in the exemplary embodiments. Here too, removal of residual monomers by steam distillation is recommended.

EP-B 505 163 relates to a process for reducing the residual monomer content of water-absorbing polymers consisting mainly of poly(meth)acrylic acid (superabsorbers), in which the polymer, in the form of its solid aqueous gel, in the form of an emulsion of this aqueous gel in oil or in its anhydrous form, is treated with, inter alia, a redox initiator system comprising aminoiminomethanesulfinic acid.

DE-A 40 15 085 discloses a process for the preparation of superabsorbers by free radical polymerization of vinylic monomers having predominantly acid functions in aqueous solution with initiation by means of a redox initiator system comprising aminoiminomethanesulfinic acid. Polymer gels which have high strengths and a lower residual monomer content were obtained as end products.

None of these prior art processes gives any indication of the suitability of aminoiminomethanesulfinic acid in free radical redox initiator systems when the latter are used for residual monomer reduction in aqueous polymer emulsions containing ≦1% by weight of residual monomers (based on polymer present), since the specific two-phase distribution of the residual monomers of aqueous polymer emulsions (polymer particles/aqueous dispersing medium) is not of relevance in any of the known processes. This is also true in the case of DE-A 39 09 790.

Thus, according to High Polymers Vol. IX, Emulsion Polymerization, Interscience Publishers, Inc., New York, 3rd Edition (1965), pages 14/16, it is important in the free radical aqueous main emulsion polymerization that free radical formation takes place not in the emulsified monomer droplets but in the aqueous phase, whereas the free radical aqueous suspension polymerization is characterized by the fact that the free radical formation takes place in the monomer droplets. This difference gives rise, for example, to the resulting polymer molecular weights differing significantly from one another when the two procedures are used. Accordingly, free radical initiator systems suitable for the two processes are those which are either highly hydrophilic or highly lipophilic, depending on the process.

EP-A 590 468 confirms these relationships.

In contrast, initiator systems which are capable of forming free radicals locally both in the aqueous phase and in the lipophilic polymer particles are more likely to be suitable for efficient free radical postpolymerization for reducing the residual monomer content in aqueous polymer emulsions.

Thus, we attribute the advantageous results found with the use of the novel process, whose defining part begins where the free radical aqueous main emulsion polymerization processes end, without any claim to validity, inter alia to the fact that aminoiminomethanesulfinic acid in aqueous solution is present in two forms in equilibrium with one another, one of which, aminoiminomethanesulfinic acid, being a relatively more hydrophilic form and the other, thiourea dioxide, being a relatively more hydrophobic form. It is considered advantageous that the tautomeric equilibrium is capable in a natural manner of adapting to the specific hydrophilic/lipophilic balance of the particular polymer emulsion by an equilibrium shift.

At this point, it should once again be stated that the nature of the polymer dispersed in the aqueous medium plays essentially no role with regard to the success of the novel process, ie. the term polymer here includes both polycondensates, for example polyesters, and polyadducts, such as polyurethanes, and polymers which are obtainable by ionic or free radical polymerization of exclusively monomers having at least one ethylenically unsaturated double bond, as well as mixtures of the stated types. All that is important is that at least one monomer having at least one ethylenically unsaturated group is involved in the synthesis of the polymer dispersed in the aqueous medium, so that there can be no problem at all with regard to the removal of residual monomers. The method of incorporation of the one or more monomers having at least one ethylenically unsaturated double bond in the dispersed polymer is, according to the invention, unimportant. It may be effected directly via ionic or free radical polymerization, via polymer-analogous reactions or by direct polyaddition or polycondensation. Furthermore, it is once again stated that, in this publication, the terminology aqueous polymer emulsion without further elaboration includes both aqueous primary emulsions and aqueous secondary emulsions.

The preparation of aqueous polymer emulsions of the above-mentioned different polymer types has been previously described in many publications and is therefore sufficiently well known to a person skilled in the art (cf. for example Encyclopedia of Polymer Science and Engineering, Vol. 8, page 659 et seq. (1987); D. C. Blackley in High Polymer Latices, Vol. 1, page 35 et seq. (1966); H. Warson, The Applications of Synthetic Resin Emulsions, page 246 et seq., Chapter 5 (1972); D. Diederich, Chemie in unserer Zeit 24, (1990), 135–142; Emulsion Polymerization, Interscience Publishers, New York (1965); DE-A 40 03 422 and Dispersionen synthetischer Hochpolymerer, F. Hölscher, Springer-Verlag, Berlin (1969)).

Monomers having at least one ethylenically unsaturated group which are suitable for the novel process include in particular monomers capable of free radical polymerization in a simple manner, such as the olefins, eg. ethylene, vinylaromatic monomers, such as styrene, α-methylstyrene, o-chlorostyrene or vinyltoluenes, esters of vinyl alcohol and monocarboxylic acids of 1 to 18 carbon atoms, such as vinyl acetate, vinyl propionate, vinyl n-butyrate, vinyl laurate, vinyl pivalate and vinyl stearate, and commercially available monomers VEOVA® 9–11 (VEOVA X is a tradename of Shell and represents vinyl esters of carboxylic acids which are also referred to as Versatic® X acids), esters of α,β-monoethylenically unsaturated mono- and dicarboxylic acids of, preferably, 3 to 6 carbon atoms, in particular acrylic acid, methacrylic acid, maleic acid, fumaric acid and itaconic acid, with alkanols of in general 1 to 12, preferably 1 to 8, in particular 1 to 4, carbon atoms, especially methyl, ethyl, n-butyl, isobutyl, tert-butyl and 2-ethylhexyl acrylate and methacrylate, dimethyl maleate or n-butyl maleate, nitriles of α,β-monoethylenically unsaturated carboxylic acids, such as acrylonitrile, and conjugated $C_4$–$C_8$-dienes, such as 1,3-butadiene and isoprene. In the case of aqueous polymer emulsions produced exclusively by the free radical aqueous emulsion polymerization method, the stated monomers are as a rule the main monomers, which together account for more than 50% by weight, based on the total amount of the monomers to be polymerized by the free radical aqueous emulsion polymerization method. As a rule, these monomers have only a moderate to slight solubility in water under standard temperature and pressure conditions (25° C., 1 atm).

Monomers which have higher water solubility under the above-mentioned conditions are, for example, α,β-monoethylenically unsaturated mono- and dicarboxylic acids and the amides thereof, eg. acrylic acid, methacrylic acid, maleic acid, fumaric acid, itaconic acid, acrylamide and methacrylamide, and vinylsulfonic acid and the water-soluble salts thereof and N-vinylpyrrolidone.

In the case of aqueous polymer emulsions produced exclusively by the free radical aqueous emulsion polymerization method, the abovementioned monomers having higher water solubility are usually additionally polymerized merely as modifying monomers in amounts of less than 50, as a rule from 0.5 to 20, preferably from 1 to 10, % by weight, based on the total amount of the monomers to be polymerized.

Monomers which usually increase the internal strength of the films of the aqueous polymer emulsions usually have at least one epoxy, hydroxyl, N-methylol or carbonyl group or at least two nonconjugated ethylenically unsaturated double bonds. Examples of these are N-alkylolamides of α,β-monoethylenically unsaturated carboxylic acids of 3 to 10 carbon atoms and their esters with alkenols of 1 to 4 carbon atoms, among which N-methylolacrylamide and N-methylolmethacrylamide are very particularly preferred, monomers having two vinyl radicals, monomers having two vinylidene radicals and monomers having two alkenyl radicals. The diesters of dihydric alcohols with α,β-monoethylenically unsaturated monocarboxylic acids are particularly advantageous, among which acrylic and methacrylic acid are preferred. Examples of such monomers having two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylates and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. The hydroxy-$C_1$–$C_8$-alkyl esters of methacrylic and acrylic acid, such as hydroxyethyl, hydroxy-n-propyl or hydroxy-n-butyl acrylate and methacrylate, and compounds such as diacetoneacrylamide and acetylacetoxyethyl acrylate or methacrylate, ureidoethyl methacrylate and acrylamidoglycolic acid, are also of particular importance in this context. In the case of aqueous polymer emulsions produced exclusively by the free radical aqueous emulsion polymerization method, the abovementioned monomers are additionally polymerized, in general in amounts of from 0.5 to 10% by weight, based on the total amount of the monomers to be polymerized.

The advantage of the uniform monomer reduction of the novel process is particularly relevant when the residual monomers to be eliminated comprise two or more monomers which differ from one another and have at least one ethylenically unsaturated group. Consequently, it proves useful when three or four or five or six or more residual monomers differing from one another are part of the aqueous polymer emulsion to be treated according to the invention.

This is true in particular when the residual monomers present in the aqueous polymer emulsion are such that they have molar solubilities S in 1000 g of water (=molal solubility in water) which differ significantly from one another under the post-polymerization conditions (as a rule, these solubilities are very similar to those at 25° C., 1 bar).

If, in a residual monomer mixture, the residual monomer which has the highest molal solubility $S_A$ is denoted by A and the residual monomer which has the lowest molal solubility $S_B$ is denoted by B, the success according to the invention is obtained essentially independently of whether the ratio $S_A/S_B$ is $\geq 1.1$ or $\geq 1.5$ or $\geq 2$ or $\geq 5$ or $\geq 10$ or $\geq 50$ or $\geq 100$ or $\geq 1000$ or $\geq 100000$.

Consequently, the success according to the invention is achieved, as a rule, if the residual monomers contain at least one residual monomer which, in the above list of possible residual monomers, was assigned to the group consisting of the moderately to slightly water-soluble monomers and at least one residual monomer which, in the corresponding list, was assigned to the group having higher water solubility.

The success according to the invention is also achieved when the residual monomer mixture comprises no chloroprene.

The success according to the invention is achieved in particular when the residual monomer mixture contains at least one of the following monomers having particularly slight solubility in water: styrene, butadiene, n-butyl acrylate and 2-ethylhexyl acrylate, and at least one of the following monomers having particularly good solubility in water: acrylic acid, methacrylic acid, acrylamide and methacrylamide. However, even when the residual monomer mixture contains moderately water-soluble monomers, such as methyl methacrylate, vinyl acetate and/or acrylonitrile, in addition to at least one of the abovementioned monomers referred to as being particularly readily soluble, the novel process is preferable.

The completely satisfactory reduction of the residual content of acrylonitrile, vinyl acetate and acrylic acid with the use of the novel process is particularly noteworthy, these substances being considered very generally as difficult to eliminate.

Moreover, the secondary products formed in the course of the reductive consumption of the compound to be used according to the invention reduce the quality (in particular the stability) of aqueous polymer emulsions, at least to a small extent. This gives rise to the possibility of simultaneously using the novel process and the stability-reinforcing stripping method, ie. directly coupling chemical and physical residual monomer reduction, as recommended in U.S. Pat. No. 4 529 753. Furthermore and, for example, in contrast to residual monomer reduction by stripping by means of steam, the novel process can consequently be used without difficulties, essentially independently of the solids volume content (solids volume, based on the volume of the aqueous polymer emulsion), ie. the solids volume content may be from 10 to 50 or from 20 to 60 or from 30 to 70% by volume, as is the case, for example, in the aqueous polymer emulsions of DE-A 42 13 965, where the applicability at high solids volume concentration (from 50 to 70% by volume or higher) is of particularly interest.

There is even a group of aqueous polymer emulsions whose quality is increased beyond a simple reduction of the residual monomer content when the novel process is used. These are aqueous polymer emulsions which are prepared with the concomitant use of substances which are sources of free formaldehyde. Examples of such substances are N-alkylolamides and N-alkoxyalkylamides of ethylnically unsaturated carboxylic acids, such as N-methylolacrylamide, N-methylolmethacrylamide, N-(isobutoxymethyl)acrylamide and N-(isobutoxymethyl) methacrylamide. The copolymerization of these monomers increases, for example, the internal strength of the films resulting from them, which is advantageous, for example, in binders for nonwovens.

In an aqueous medium, however, these auxiliary monomers are in equilibrium with free formaldehyde just as hydroxymethanesulfinic acid (formaldehyde sulfoxylate) or the salts thereof, which are used as reducing agents in free radical redox initiators for the preparation of aqueous polymer emulsions.

Remarkably, such aqueous polymer emulsions containing free formaldehyde, as disclosed, for example, in DE-C 40 40 959, EP-A 311 908 and EP-A 147 759, have a reduced content of free formaldehyde after the use of the novel process.

The novel process can be used in both alkaline and acidic aqueous dispersing medium, ie. the range of use extends from pH 1 to pH 12.

The applicability at acidic pH is important, for example, when the aqueous polymer emulsion contains from $\geq 5$ to 60% by weight, based on the polymer, of acrylic acid as copolymerized units. If the pH of aqueous polymer emulsions having the abovementioned acrylic acid content is increased, their dynamic viscosity increases considerably. Such aqueous polymer emulsions are therefore advantageously used as thickener emulsions (cf. for example German Patents 1,164,095, 1,264,945, 1,258,721, 1,546,315 and 1,265,752). In this respect, they are produced in an acidic medium with relatively low viscosity. The thickening effect is achieved by the user himself, by increasing the pH. This is therefore one of the cases where the residual monomer reduction is to be carried out by the producer of the aqueous polymer emulsion at a pH of the aqueous dispersing medium of less than 7 (as a rule from <7 to 2).

However, the novel process is preferably used at a pH of the aqueous dispersing medium of from 6 to 10, particularly preferably from 7 to 9. This is advantageous for aqueous polymer emulsions whose disperse phase is stabilized by the presence of anionic groups. These are, for example, aqueous polymer emulsions which are stabilized by the presence of anionic emulsifiers or which contain, as polymerized units, $\alpha,\beta$-monoethylenically unsaturated carboxylic acids of 3 to 6 carbon atoms, such as acrylic acid (as a rule from 0.1 to 5, preferably from 0.5 to 4, % by weight based on the dispersed polymer), in order to stabilize the disperse phase alone or concomitantly.

In the case of the novel residual monomer reduction (even when used at temperatures of from 20° to 50° C.), it is, remarkably, not necessary to use the novel redox initiator system in the presence of a metal compound which is soluble in the aqueous reaction medium and whose metallic component (for example iron, vanadium or a mixture thereof) may occur in a plurality of valency states. However, it may of course also be used in the presence of such a compound. If so, it is generally used in amounts of from 0.01 to 1% by weight, based on oxidizing agent or reducing agent (the substoichiometric component in each case) and calculated as metal compound to be added. Examples of suitable compounds of this type are iron(II) sulfate, iron(II) chloride, iron(II) nitrate, iron(II) acetate and the corresponding iron (III) salts, ammonium or alkali metal vanadates (V(V)), vanadium(III) chloride, vanadyl(V) trichloride and in particular vanadyl(IV) sulfate pentahydrate. Complexing agents which keep the metals in solution under reaction conditions are frequently also added.

Temperatures of from 0° to 100° C., preferably from 20° to 90° C., in particular from 50° to 80° C., are recommended for use in the novel residual monomer reduction. Under pressure, however, correspondingly higher temperatures are also possible. A suitable working pressure is from $\geq 1$ to 15 bar. It is particularly advantageous to carry out the novel postpolymerization above the minimum film formation temperature, MFT (white point temperature), of the resulting aqueous polymer emulsion. In the case of aqueous polymer emulsions whose MFT is below 0° C., the statistical glass transition temperature $T_g$ (DSC, midpoint temperature) of the dispersed polymer is used instead of the MFT (cf. Ullmann's Encyclopedia of Industrial Chemistry, VCH, Weinheim, Vol. A21 (1992), page 169). The working temperature is preferably at least 20° C., preferably at least 40° C., advantageously at least 60° C., particularly preferably at least 80° C. and very particularly advantageously at least 100° C., above the relevant MFT or $T_g$ values (this relationship is said to be generally applicable for postpolymerizations). In the case of polymer emulsions which have more than one $T_g$, the lowest of these values should be used.

As for free radical polymerization processes generally, the novel process can be used both under an inert gas atmosphere (eg. $N_2$, Ar) and under an oxygen-containing atmosphere (eg. air). The fact that the reducing agent to be used according to the invention is capable of effecting a significant reduction in the residual monomer content in the sole presence of molecular oxygen as the oxidizing agent is a considerable advantage. This fact together with the lower temperatures required for use is of interest particularly with regard to a reduction of the residual monomer content of the aqueous polymer emulsion in the storage tank of said emulsion. It also opens up the possibility to limit the otherwise necessary addition of other oxidizing agents and thus, for example, to provide advantageous conditions for the biocidal treatment of the aqueous polymer emulsion.

It is also advantageous that the use of the novel process usually does not give rise to any discoloration of the resulting aqueous polymer emulsions. The excellent handling properties and shelf-life of the reducing agent to be used according to the invention are also advantageous.

As stated above, the novel process can be used in particular for aqueous polymer emulsions whose dispersed polymer is produced, without the novel residual monomer elimination, by the free radical aqueous emulsion polymerization method from monomers having at least one ethylenically unsaturated group, and it is for this reason that all statements made in this publication relate in particular to aqueous primary emulsions prepared by the free radical aqueous emulsion polymerization method. The free radical aqueous emulsion polymerization is preferably carried out by the feed method, ie. the predominant amount of the monomers to be polymerized, as a rule from 50 to 100, preferably from 70 to 100, particularly preferably from 80 to 100, very particularly advantageously from 90 to 100, % by weight of their total amount, are not added to the polymerization vessel until from the beginning of the free radical aqueous emulsion polymerization onward, at the rate at which the polymerization of the monomers already present in the polymerization vessel takes place. As a rule, the addition is effected by continuous feeding (as a rule as pure monomer feed or preemulsified in the aqueous phase), at a rate such that at least 80, preferably at least 90, very particularly preferably at least 95, % by weight of the monomers already present in the polymerization vessel have been incorporated as polymerized units. Aqueous seed polymer emulsions may be concomitantly used to establish the particle size of the dispersed polymer particles (cf. EP-B 40419 and Encyclopedia of Polymer Science and Technology, Vol. 5, John Wiley & Sons Inc., New York (1966), page 847).

Suitable free radical polymerization initiators for the main polymerization reaction described above are all those which are capable of initiating a free radical aqueous emulsion polymerization. These may be both peroxides and azo compounds. However, redox initiator systems are of course also suitable. As a rule, the free radical initiator system used for the main polymerization will differ from the free radical initiator system to be used according to the invention for the postpolymerization. Furthermore, as a rule at least 50, more frequently at least 75, in general at least 90, % by weight of the monomers to be polymerized in the main polymerization are polymerized in the absence of the novel reducing agent, ie. the main polymerization will usually not include any novel reducing agent. To carry out the free radical aqueous emulsion polymerization as the main polymerization reaction in a particularly efficient manner from the point of view of the desired properties and with a view to achieving high cost-effectiveness, the use of peroxodisulfuric acid and/or the alkali metal salts thereof and/or its ammonium salt as free radical initiators is preferred. The amount of the free radical initiator systems used is preferably from 0.1 to 2% by weight, based on the total amount of the monomers to be polymerized. The manner in which the free radical initiator system is added to the polymerization vessel in the course of the free radical aqueous main emulsion polymerization described tends to be of minor importance. The initiator system may be either initially taken in its entirety in the polymerization vessel or added continuously or stepwise at the rate at which it is consumed in the course of the free radical aqueous emulsion polymerization. Specifically, this depends, in a manner known per se to a person skilled in the art, both on the chemical nature of the initiator system and on the polymerization temperature.

A direct consequence of the abovementioned fact is that the total range from 0° to 100° C. is suitable as a reaction temperature for the abovementioned free radical aqueous main emulsion polymerization, but temperatures of from 70° to 100° C., preferably from 80° to 100° C., particularly preferably from >85 to 100° C., are preferably used.

The use of superatmospheric or reduced pressure is possible, so that the polymerization temperature may also exceed 100° C. and may be up to 130° C. or more. Readily volatile monomers, such as ethylene, butadiene or vinyl chloride, are preferably polymerized under superatmospheric pressure. It is of course possible concomitantly to use molecular weight regulators, such as tert-dodecyl mercaptan, in the free radical aqueous main emulsion polymerization.

Dispersants which ensure the stability of the aqueous polymer emulsion produced are usually concomitantly used in the free radical aqueous emulsion polymerization. Suitable dispersants are both the protective colloids usually used for carrying out said emulsion polymerizations and emulsifiers.

Examples of suitable protective colloids are polyvinyl alcohols, cellulose derivatives or vinylpyrrolidone-containing copolymers. A detailed description of further suitable protective colloids appears in Houben-Weyl, Methoden der organischen Chemie, Volume XIV/1, Makromolekulare Stoffe, Georg-Thieme-Verlag, Stuttgart, 1961, pages 411 to 420. Mixtures of emulsifiers and/or protective colloids may of course also be used. Preferably, exclusively emulsifiers whose relative molecular weights, in contrast to the protective colloids, are usually less than 1000 are used as dispersants. They may be anionic, cationic or nonionic. Where mixtures of surfactants are used, the individual components must of course be compatible with one another, which in case of doubt can be checked by means of a few preliminary experiments. In general, anionic emulsifiers are compatible with one another and with nonionic emulsifiers. The same applies to cationic emulsifiers, whereas anionic and cationic emulsifiers are generally incompatible with one another. Conventional emulsifiers are, for example, ethoxylated mono-, di- and trialkylphenols (degree of ethoxylation: from 3 to 100, alkyl radical: $C_4$ to $C_{12}$), ethoxylated fatty alcohols (degree of ethoxylation: from 3 to 100, alkyl radical: C8 to $C_{18}$) and alkali metal and ammonium salts of alkylsulfates (alkyl radical: $C_8$ to $C_{16}$), of sulfuric half-esters of ethoxylated alkanols (degree of ethoxylation: from 1 to 70, alkyl radical: $C_{12}$ to $C_{18}$) and of ethoxylated alkylphenols (degree of ethoxylation: from 3 to 100, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$). Further suitable emulsifiers, such as sulfosuccinic esters, are described in Houben-Weyl, Methoden der organischen Chemie, Volume XIV/1, Makromolekulare Stoffe, Georg-Thieme Verlag, Stuttgart, 1961, pages 192 to 208.

Other surfactants which have proven suitable are compounds of the general formula I

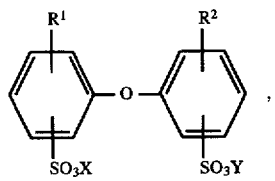

where $R^1$ and $R^2$ are each hydrogen or $C_4$–$C_{24}$-alkyl and are not simultaneously hydrogen and X and Y are alkali metal ions and/or ammonium ions. In the formula I, $R^1$ and $R^2$ are each preferably linear or branched alkyl of 6 to 18, in particular 6,12 or 16, carbon atoms or hydrogen, $R^1$ and $R^2$ not both being hydrogen simultaneously. X and Y are preferably sodium, potassium or ammonium ions, sodium being particularly preferred. Compounds I in which X and Y are each sodium, $R^1$ is branched alkyl of 12 carbon atoms and $R^2$ is hydrogen or $R^1$ are particularly advantageous. Industrial mixtures which contain from 50 to 90% by weight of the monoalkylated product, for example Dowfax® 2A1 (trademark of Dow Chemical Company), are frequently used. In the novel process, the compounds I are used as dispersants preferably by themselves and particularly preferably as a mixture with ethoxylated fatty alcohols (degree of ethoxylation: from 3 to 50, alkyl radical: $C_8$ to $C_{36}$). The compounds I are generally known, for example from U.S. Pat. No. 4,269,749, and are commercially available.

As a rule, the amount of dispersant used is from 0.5 to 6, preferably from 1 to 3, % by weight, based on the monomers to be subjected to free radical polymerization.

The abovementioned dispersants are of course suitable very generally for stabilizing the direct novel products of the process. However, said products include aqueous polymer emulsions of self-emulsifying polymers, ie. of polymers which have ionic groups which, owing to the repulsion of charges of the same sign, are capable of effecting stabilization. Said products are preferably anionically stabilized (contain in particular anionic dispersants).

If the preparation of that aqueous polymer emulsion whose residual monomer content is to be reduced in the manner according to the invention is carried out by the free radical aqueous emulsion polymerization method from monomer compositions comprising monomers having at least one ethylenically unsaturated group, monomer compositions which are of particular importance with regard to the novel process are those which comprise at least two monomers which differ from one another and have at least one ethylenically unsaturated group and additionally contain from 70 to 99.9% by weight of esters of acrylic and/or methacrylic acid with alkanols of 1 to 12 carbon atoms and/or styrene, or from 70 to 99.9% by weight of styrene and/or butadiene or from 70 to 99.9% by weight of vinyl chloride and/or vinylidene chloride or from 40 to 99.9% by weight of vinyl acetate, vinyl propionate and/or ethylene.

Particularly relevant with regard to the novel process are monomer compositions which comprise:

| | |
|---|---|
| from 0.1 to 5% by weight | of at least one α,β-monoethylenically unsaturated carboxylic acid of 3 to 6 carbon atoms and/or the amide thereof (monomers A) and |
| from 70 to 99.9% by weight | of esters of acrylic and/or methacrylic acid with alkanols of 1 to 12 carbon atoms and/or styrene (monomers B) |
| from 0.1 to 5% by weight | of at least one α,β-monoethylenically unsaturated carboxylic acid of 3 to 6 carbon atoms and/or the amide thereof (monomers A) and |
| from 70 to 99.9% by weight | of styrene and/or butadiene (monomers B') |
| or | |
| from 0.1 to 5% by weight | of at least one α,β-monoethylenically unsaturated carboxylic acid of 3 to 6 carbon atoms and/or the amide thereof (monomers A) and |
| from 70 to 99.9% by weight | of vinyl chloride and/or vinylidene chloride (monomers B") |
| or | |
| from 0.1 to 5% by weight | of at least one α,β-monoethylenically unsaturated carboxylic acid of 3 to 6 carbon atoms and/or the amide thereof (monomers A) and |
| from 40 to 99.9% by weight | of vinyl acetate, vinyl propionate and/or ethylene (B'''). |

The novel process is of very particular relevance in the case of the abovementioned monomer compositions when the monomer A is acrylic acid.

The novel process is also preferable in the case of free radical aqueous emulsion polymerizations of monomer compositions which comprise:

| | |
|---|---|
| from 0.1 to 30 | (preferably from 0.5 to 15) % by weight of acrylonitrile and |
| from 70 to 99.9% by weight | of esters of acrylic and/or methacrylic acid with alkanols of 1 to 12 carbon atoms and/or styrene |
| or | |
| from 0.1 to 30 | (preferably from 0.5 to 15) % by weight of acrylonitrile and |
| from 70 to 99.9% by weight | of styrene and/or butadiene |
| or | |
| from 0.1 to 40% by weight | of vinyl acetate and/or vinyl propionate and |
| from 60 to 99.9% by weight | of esters of acrylic and/or methacrylic acid with alkanols of 1 to 12 carbon atoms and/or styrene. |

However, the novel process is very particularly preferable in the case of free radical aqueous emulsion polymerizations of monomer compositions which comprise:

| | |
|---|---|
| from 0.1 to 5% by weight | of at least one α,β-monoethylenically unsaturated carboxylic acid of 3 to 6 carbon atoms and/or the amide thereof, in particular acrylic acid, |
| from 0.1 to 30 | (preferably from 0.5 to 15) % by weight of acrylonitrile and |
| from 69.9 to 99.9% by weight | of esters of acrylic and/or methacrylic acid with alkanols of 1 to 12 carbon atoms and/or styrene |
| or | |
| from 0.1 to 5% by weight | of at least one α,β-monoethylenically unsaturated carboxylic acid of 3 to 6 carbon atoms and/or the amide thereof, in particular acrylic acid, |
| from 0.1 to 30 | (preferably from 0.5 to 15) % by |

| | |
|---|---|
| from 69.9 to 99.9% by weight or | weight of acrylonitrile and of styrene and/or butadiene |
| from 0.1 to 5% by weight | of at least one α,β-monoethylenically unsaturated carboxylic acid of 3 to 6 carbon atoms and/or the amides thereof, in particular acrylic acid, |
| from 0.1 to 40% by weight | of vinyl acetate and/or vinyl propionate and |
| from 59.9 to 99.9% by weight | of esters of acrylic and/or methacrylic acid with alkanols of 1 to 12 carbon atoms and/or styrene. |

Preferably, the stated monomer compositions contain no chloroprene and are chosen so that the $T_g$ values of the resulting dispersed polymers are below 50° C., preferably below 25° C., very particularly preferably below 0° C. (down to −70° C.).

In the case of aqueous polymer emulsions which contain residual monomers and whose dispersed polymer is produced from monomers having at least one ethylenically unsaturated group by free radical aqueous emulsion polymerization, the residual monomer content generally reaches or remains below the 1% by weight limit, based on the total aqueous emulsion, in this free radical aqueous main emulsion polymerization itself. Where this is not possible, as stated above the novel process for residual monomer reduction either can be used directly afterward or conventional prior art residual monomer reduction methods can initially be used until the abovementioned limit is reached, before continuing according to the invention, in order to utilize the advantages of the novel process. In general, the main polymerization reaction may be followed smoothly by the novel step for residual monomer reduction. Furthermore, the novel free radical redox initiator system may already have been used in the main polymerization reaction.

In addition to the aminoiminomethanesulfinic acid, the free radical redox initiators to be used according to the invention may of course additionally comprise other reducing agents, such as reducing sugars, eg. glucose and fructose, derivatives thereof, such as ascorbic acid, or sulfinic acids, such as hydroxymethanesulfinic acid, or alkanesulfinic acids, such as isopropylsulfinic acid (or the salts thereof). However, the aminoiminomethanesulfinic acid preferably accounts for more than 50, preferably more than 75, % by weight of the total amount of reducing agents used and very particularly preferably is the sole reducing agent. Instead of direct addition as aminoiminomethanesulfinic acid, the novel reducing agent may also be produced, for example, in situ by adding thiourea and hydrogen peroxide.

Examples of suitable oxidizing components of the free radical redox initiators to be used according to the invention are molecular oxygen, ozone, agents which donate oxygen with free radical formation and do not have the peroxide structure, such as alkali metal chlorates and perchlorates, transition metal oxide compounds, such as potassium permanganate, manganese dioxide and lead oxide, as well as lead tetraacetate and iodobenzene. However, peroxides, hydroperoxides or mixtures thereof are preferably used.

Hydrogen peroxide, peroxodisulfuric acid and its salts, in particular its alkali metal salts, tert-butyl hydroperoxide and the use thereof with oxygen have proven particularly advantageous. Preferably, exclusively tert-butyl hydroperoxide or tert-butyl hydroperoxide and oxygen is used.

The oxidizing agent and reducing agent should as a rule be used in the novel process in a molar ratio of from 0.1:1 to 1:0.1, preferably from 0.5:1 to 1:0.5, particularly preferably from 0.75:1 to 1:0.75. They are preferably used in equivalent amounts.

In the novel process, the free radical redox initiator system to be used according to the invention can in principle be added all at once to the aqueous polymer emulsion containing the residual monomers. However, the oxidizing agent may also be added all at once and the reducing agent then fed in continuously. It is however also possible to add the oxidizing agent and the reducing agent continuously in the course of a few hours, via separate feeds, to the aqueous polymer emulsion to be treated. Frequently, the two feeds are started and ended essentially at the same time, ie. feeding is essentially carried out synchronously. The feed is advantageously effected in the form of aqueous solutions.

The amounts to be used of the free radical redox initiator system to be used according to the invention depend of course on the amount of residual monomers still present and on the desired degree of reduction of said monomers.

As a rule, the amount to be used is from 0.01 to 5, advantageously from 0.1 to 1, % by weight, based on the dispersed polymer. It is of course possible for the novel process to be followed by other processes for reducing the residual monomer content.

Finally, it should also be stated that the free radical redox initiator systems to be used according to the invention permit effective reduction of the residual monomer content in a short time. The residual monomer contents determined in the examples below are based on gas chromatographic determinations.

EXAMPLES AND COMPARATIVE EXAMPLES

A) Preparation of an aqueous polymer emulsion containing residual monomers (inert gas atmosphere)

200 g of demineralized water, 40 g of Feed 1, 12.5 g of a 20% strength by weight aqueous solution of an ethoxylated fatty alcohol mixture ($C_{16}/C_{18}$, degree of ethoxylation: 18), 5 g of a 20% strength by weight aqueous solution of the active ingredient corresponding to Dowfax 2A1 and 10 g of Feed 2 were initially taken as a mixture in a polymerization vessel while stirring and were heated to 85° C. After 15 minutes, the remaining amount of Feed 1 (in the course of 3 hours) and the remaining amount of Feed 2 (in the course of 3.5 hours) were added continuously to the polymerization vessel via separate feeds, beginning at the same time (while maintaining the temperature of 85° C.). After the end of Feed 2, stirring was continued for a further hour at 85° C.

Feed 1 (stirred during the addition):

165 g of demineralized water,
25 g of 20% strength by weight aqueous solution of an ethoxylated fatty alcohol mixture ($C_{16}/C_{18}$, degree of ethoxylation: 18),
32.5 g of 20% strength by weight aqueous solution of the active ingredient corresponding to Dowfax 2A1,
10 g of 50% strength by weight aqueous acrylamide solution,
12.5 g of acrylic acid,
250 g of styrene and
250 g of n-butyl acrylate.

Feed 2:

100 g of demineralized water and
1 g of sodium peroxodisulfate.

An aqueous polymer emulsion A whose solids content was 48.3% by weight and which, when diluted to a solids content of 0.01% by weight, had a light transmittance (LT), relative to pure water, of 81% at 25° C. (2.5 cm path length) was obtained.

The aqueous dispersing medium had a pH of 2.7. Six batches of the type described above were combined. The combination had the following residual monomer contents:

n-Butyl acrylate: 12000 mg/kg of emulsion
Styrene: 2000 mg/kg of emulsion

B) Reduction of the residual monomer content of the aqueous polymer emulsion A by postpolymerization using various free radical redox initiator systems (200 g of the combination described above were used in each case)

At a defined initial pH of the aqueous dispersing medium, one of the three methods below was used in each case (the initial pH was increased by means of 10% strength by weight aqueous NaOH solution):

a) Selected oxidizing and reducing agents (amounts stated in each case in % by weight, based on the dispersed polymer) were added all at once as 2% strength by weight aqueous solutions to the aqueous polymer emulsion A, and the mixture was then left to stand at 23° C.

in a closed vessel for a period X (inert gas atmosphere, N₂). Immediately thereafter, the residual monomers were determined.

b) The aqueous polymer emulsion A was heated to 70° C. and the selected oxidizing agent was added all at once as a 2% strength by weight aqueous solution. While maintaining the temperature at 70° C., the reducing agent was metered in continuously in the course of 30 minutes as a 2% strength by weight aqueous solution. The mixture was then stirred for a further 30 minutes at 70° C. Thereafter, either the postpolymerization was stopped by adding 10 mg of hydroquinone and the mixture was analyzed by gas chromatography (variant b*) or the samples were left to stand for a further three days in a closed vessel at 23° C. (variant b) and then analyzed (inert gas atmosphere, N₂). The stated amounts of oxidizing and reducing agents are once again in % by weight based on the dispersed polymer.

c) Exclusively reducing agent was added all at once as a 2% strength by weight aqueous solution to the aqueous polymer emulsion A, and the emulsion was left to stand for 3 days at 23° C. in a vessel open to the air. Gas chromatographic analysis was then carried out. The stated amount of added reducing agent is once again in % by weight based on the dispersed polymer.

In all cases according to the invention, the resulting total residual monomer content was well below 1% by weight, based on the dispersed polymer.

The results obtained are shown in Table 1 below. The letter C indicates the Comparative Examples.

TABLE 1

| Oxidizing agent/ amount | | Reducing agent/ amount | Initial pH | Method | Residual monomer content (mg/kg of emulsion) | |
|---|---|---|---|---|---|---|
| | | | | | n-Butyl acrylate | Styrene |
| 0.1 t-BHP | C | 0.1 Na disulfite | 2.7 | b | 7100 | 660 |
| 0.1 t-BHP | | 0.1 AIMS | 2.7 | b | 3400 | 110 |
| 0.2 t-BHP | | 0.2 AIMS | 2.7 | b | 730 | 20 |
| 0.1 t-BHP | C | 0.1 Rongalite C | 8 | b* | 5840 | 490 |
| 0.1 t-BHP | | 0.1 AIMS | 8 | b* | 560 | 36 |
| 0.1 NaPS | | 0.1 AIMS | 8 | b* | 1168 | 10 |
| 0.1 t-BHP | C | 0.1 Rongalite C | 8 | a, X = 4 days | 414 | 21 |
| 0.1 t-BHP | C | 0.1 Na disulfite | 8 | a, X = 4 days | 234 | 21 |
| 0.1 t-BHP | C | 0.1 ascorbic acid | 8 | a, X = 4 days | 212 | 21 |
| 0.1 t-BHP | | 0.1 AIMS | 8 | a, X = 4 days | 180 | 10 |
| 0.1 NaPS | C | 0.1 Rongalite C | 8 | a, X = 4 days | 2120 | 149 |
| 0.1 NaPS | | 0.1 AIMS | 8 | a, X = 4 days | 998 | 42 |
| 0.2 NaPS | | 0.1 AIMS | 8 | a, X = 4 days | 550 | 21 |
| 0.1 t-BHP | | 0.1 AIMS | 6 | a, X = 4 days | 1020 | 110 |
| 0.1 t-BHP | | 0.1 AIMS | 7 | a, X = 4 days | 369 | 30 |
| 0.1 t-BHP | | 0.1 AIMS | 8 | a, X = 4 days | 180 | 10 |
| 0.1 t-BHP | | 0.1 AIMS | 8 | a, X = 1 h | 1168 | 63 |
| 0.1 t-BHP | | 0.1 AIMS | 8 | 1, X = 2 h | 955 | 24 |
| 0.1 t-BHP | | 0.1 AIMS | 8 | a, X = 4 h | 541 | 16 |
| — | | — | 8 | c | 11250 | 1770 |
| — | | 0.1 AIMS | 8 | c | 4425 | 103 |
| — | | 0.1 AIMS | 10 | c | 3525 | 57 |
| — | | 0.1 AIMS | 12 | c | 2850 | 34 |
| — | C | 0.1 Rongalite C | 8 | c | Emulsion gelled in the course of time | |
| — | C | 0.1 Rongalite C | 10 | c | 10500 | 1720 |
| — | C | 0.1 Rongalite C | 12 | c | 9800 | 1542 |
| 0.1 t-BHP | | 0.1 AIMS | 8 | c | 68 | 7 | t-BHP: tert-butyl hydroperoxide
Na disulfite: sodium disulfite (Na₂S₂O₅)
Rongalite C: sodium salt of hydroxymethanesulfinic acid
AIMS: aminoiminomethanesulfinic acid
NaPS: sodium peroxodisulfite C) Main emulsion polymerization (inert gas atmosphere)

A mixture of 10 g of a 30% strength by weight hydrogen peroxide solution, 48 g of feed and 500 g of demineralized water was heated to 60° C. Thereafter, 10 g of a solution of 3 g of ascorbic acid in 200 g of water were added all at once while maintaining a temperature of 50° C. and stirring was carried out for 15 minutes at 50° C. The remaining amount of the feed was then added continuously in the course of 120 minutes while maintaining a temperature of 60° C., and the reaction mixture was stirred for a further 60 minutes at 60° C. after the end of the feed.

The resulting aqueous polymer emulsion had a solids content of 48.2% by weight.

The pH of the dispersing medium was 2.9.

Composition of feed:

1190 g of ethyl acrylate,
150 g of acrylonitrile,
120 g of methyl acrylate,
78 g of 48% strength by weight aqueous N-methylol-methacrylamide solution,
64 g of a 35% strength by weight aqueous solution of the sodium salt of sulfated octylphenol ethoxylate (degree of ethoxylation: 25) = emulsifier solution 1,
112 g of a 20% strength by weight aqueous solution of ethoxylated octylphenol (degree of ethoxylation: 25) = emulsifier solution 2 and
670 g of demineralized water.

The residual monomer content of the aqueous polymer emulsion comprised 6500 mg of ethyl acrylate/kg of emulsion,
800 mg of methyl acrylate/kg of emulsion and
770 mg of acrylonitrile/kg of emulsion.

Postpolymerization (inert gas atmosphere)

The pH of 200 g of each of the aqueous polymer emulsions obtained in the main emulsion polymerization was increased to 7.1 with concentrated ammonia. The oxidizing agent was then added all at once at 25° C. (amount stated in % by weight, based on dispersed polymer). Stirring was carried out for 10 minutes, after which aminoiminomethanesulfinic acid was added all at once (amount stated in % by weight, based on dispersed polymer) and 20 mg of FeSO$_4$.7H$_2$O were introduced and stirring was then carried out for 2 hours at 25° C. The aqueous polymer emulsion was then left to stand for a further 24 hours at 25° C. The residual monomer content then determined was well below 1% by weight, based on dispersed polymer, in all cases.

The specific results and amounts used are shown in Table 2.

TABLE 2

| Oxidizing agent/amount | | Reducing agent/amount | Residual monomer content (mg/kg of emulsion) | | |
|---|---|---|---|---|---|
| | | | Ethyl acrylate | Methyl acrylate | Acrylonitrile |
| 0.2 | t-BHP | 0.24 AIMS | 760 | 150 | 72 |
| 0.076 | H$_2$O$_2$ | 0.24 AIMS | 780 | 160 | 77 |
| 0.53 | NaPS | 0.24 AIMS | 1000 | 190 | 100 |
| 0.2 | t-BHP | 0.48 AIMS | 220 | 90 | 12 |
| 0.076 | H$_2$O$_2$ | 0.48 AIMS | 520 | 120 | 40 |
| 0.53 | NaPS | 0.48 AIMS | 690 | 150 | 60 |

(The abbreviations correspond to those for Table 1)

As for C), but the additions and the postpolymerization were carried out at 60° C. The results and amounts used are shown in Table 3. The abbreviations chosen correspond to those for Table 1.

TABLE 3

| Oxidizing agent/amount | | Reducing agent/amount | Residual monomer content (mg/kg of emulsion) | | |
|---|---|---|---|---|---|
| | | | Ethyl acrylate | Methyl acrylate | Acrylonitrile |
| 0.2 | t-BHP | 0.24 AIMS | <10 | 36 | <10 |
| 0.076 | H$_2$O$_2$ | 0.24 AIMS | 126 | 10 | <10 |

E) Main emulsion polymerization (inert gas atmosphere)

A mixture of 2.6 g of a 40% strength by weight aqueous solution of the sodium salt of a C$_{16}$-paraffinsulfonate (emulsifier solution 3), 4.2 g of sodium vinylsulfonate, 15 mg of FeSO$_4$.7H$_2$O, 625 g of demineralized water and 80 g of Feed 1 was heated to 85° C. Thereafter, while maintaining a temperature of 70° C., 58 g of Feed 2 were added all at once and stirring was carried out for 15 minutes. The remaining amount of Feed 1 (in the course of 120 minutes) and Feed 2 (in the course of 135 minutes) were then added continuously beginning at the same time and while maintaining a temperature of 85° C. After the end of Feed 2, stirring was carried out for a further 60 minutes at 85° C., stabilization was effected with the addition of 12 g of emulsifier solution 3 and the pH was increased to 8.0 by adding aqueous calcium hydroxide paste (97 g of calcium hydroxide in 85 g of water). The solids content of the resulting aqueous polymer emulsion was 48.1% by weight.

Feed 1:

1170 g of n-butyl acrylate
105 g of acrylonitrile
225 g of methacrylic acid
0,5 g of sodium vinylsulfonate
15 g of emulsifier solution 3
510 g of demineralized water Feed 2:

12 g of sodium peroxodisulfate
375 g of demineralized water

The residual monomer content of the aqueous polymer emulsion comprised:

260 mg of acrylonitrile/kg of emulsion and
3800 mg of n-butyl acrylate/kg of emulsion.

Postpolymerization (inert gas atmosphere)

0.1% by weight of t-BHP or NaPS was added (at 25° C.) to 450 g of each of the aqueous polymer emulsions obtained in the main emulsion polymerization. Thereafter, 21.6 g of a 1% strength by weight aqueous AIMS solution were added at 25° C. and the mixture was kept in each case for 24 hours at 25° C., after which the residual monomer content was determined. It was <<1% by weight, based on dispersed polymer and comprised:

17 mg of acrylonitrile/kg of emulsion
280 mg of n-butyl acrylate/kg of emulsion
(t-BHP as oxidizing agent)
or
60 mg of acrylonitrile/kg of emulsion
770 mg of n-butyl acrylate/kg of emulsion
(NaPS as oxidizing agent)

F) Main emulsion polymerization (inert gas atmosphere)

A mixture of 3.5 kg of vinyl acetate, 2.5 kg of emulsifier solution 2, 0.25 kg of sodium vinylsulfonate, 1 g of FeSO$_4$.7H$_2$O and 19 kg of demineralized water was heated to 60° C. A solution of 0.15 kg of sodium peroxodisulfate in 5.8 kg of water was then metered in continuously in the course of 3 hours while maintaining a temperature of 30° C. In addition, a monomer emulsion was added continuously in the course of 2 hours, starting at the beginning of the polymerization. After the end of the initiator feed, the mixture was kept at 60° C. for a further hour, stabilized with 0.7 kg of aqueous emulsifier solution 1, cooled to room temperature and filtered through a 120 μm filter. The solids content of the resulting aqueous polymer emulsion was 49.2% by weight and the pH of the dispersing medium was 4.7.

Composition of the monomer emulsion:

37.5 kg of vinyl acetate
7.5 kg of n-butyl acrylate
3.2 kg of 48% strength by weight aqueous N-methylol-acrylamide solution
1.1 kg of aqueous emulsifier solution 1
1.9 kg of aqueous emulsifier solution 2
17.9 kg of demineralized water The residual monomer content of the aqueous polymer emulsion comprised 2,800 mg of vinyl acetate/kg of emulsion.

Postpolymerization (inert gas atmosphere)

The pH of 600 g of the aqueous polymer emulsion obtained in the main emulsion polymerization was brought to 7.1 by means of concentrated ammonia. 0.2% by weight (based on dispersed polymer) of t-BHP in the form of a 2% strength by weight aqueous solution was then added all at once at 25° C. 35 g of a 2% strength by weight aqueous AIMS solution were then added continuously at 25° C. in the course of 30 minutes. The aqueous polymer emulsion was then left to stand for a further 6 days at 25° C.

The residual content of vinyl acetate monomer which was then determined was only 30 mg of vinyl acetate/kg of emulsion. The total residual monomer content was well below 1% by weight, based on dispersed polymer.

G) Main emulsion polymerization (inert gas atmosphere)

45 g of a monomer emulsion were stirred into 615 g of water and the mixture was heated to 60° C. Thereafter, 5% by weight of an oxidizing agent solution containing 4 g of sodium peroxodisulfate in 100 g of water and 5% by weight of a reducing agent solution containing 2.7 g of Rongalite in 100 g of water were added at 50° C. and the mixture was stirred at this temperature for 15 minutes. The remainder of the monomer emulsion (in the course of 120 minutes), the remainder of the oxidizing agent solution and the remainder of the reducing agent solution (in each case in the course of 135 minutes) were then metered in continuously at 60° C., beginning at the same time, and the reaction mixture was then kept at 60° C. for a further 60 minutes. An aqueous polymer emulsion of which the solids content was 43.9% by weight and which had a pH of 2.3 was obtained.

Composition of the monomer emulsion:

1200 g of n-butyl acrylate
135 g of acrylonitrile
13.5 g of acrylic acid
90 g of a 30% strength by weight aqueous solution of the sodium salt of sulfated lauryl alcohol -continued Composition of the monomer emulsion:

ethoxylate (degree of ethoxylation: 30) = emulsifier solution 4
68 g of a 20% strength by weight aqueous solution of ethoxylated tallow fatty alcohol (degree of ethoxylation: 30)
770 g of demineralized water The residual monomer content of the aqueous polymer emulsion comprised:

13000 mg of n-butyl acrylate/kg of emulsion
2700 mg of acrylonitrile/kg of emulsion The aqueous polymer emulsion also contained 71 mg of formaldehyde/kg of emulsion.

Postpolymerization (inert gas atmosphere)

300 g of the aqueous polymer emulsion obtained in the main emulsion polymerization were heated to 70° C. using a reflux condenser. 0.4% by weight, based on dispersed polymer, of NaPS (as a 5% strength by weight aqueous solution) was then added all at once. Thereafter, a 1% strength by weight aqueous solution of AIMS (altogether 0.2% by weight, based on dispersed polymer, of AIMS) was metered in over 10 minutes and the mixture was then stirred for a further 3 hours at 70° C. The aqueous emulsion then still contained:

2000 mg of n-butyl acrylate/kg of emulsion
6 mg of acrylonitrile/kg of emulsion
8 mg of formaldehyde/kg of emulsion.

The total residual monomer content was less than 1% by weight, based on dispersed polymer.

H) Example G was repeated, but the composition of the monomer emulsion was:

1000 g of ethyl acrylate
335 g of vinyl acetate
13.5 g of acrylic acid
90 g of aqueous emulsifier solution 4
68 g of aqueous emulsifier solution 5
770 g of demineralized water An aqueous polymer emulsion whose solids content was 43.6% by weight and which had a pH of 2.2 was obtained.

The residual monomer content of the aqueous polymer emulsion comprised:

7300 mg of vinyl acetate/kg of emulsion
180 mg of ethyl acrylate/kg of emulsion

The aqueous polymer emulsion also contained 86 mg of formaldehyde/kg of emulsion.

Postpolymerization (inert gas atmosphere)

300 g of the aqueous polymer emulsion obtained in the main emulsion polymerization were heated to 70° C. using a reflux condenser. 0.4% by weight, based on dispersed polymer, of NaPS (as a 5% strength by weight aqueous solution) was then added all at once. Thereafter, a 1% strength by weight aqueous solution of AIMS (altogether 0.2% by weight, based on dispersed polymer, of AIMS) was metered in over 10 minutes and the mixture was then stirred for a further 3 hours at 70° C. The total residual monomer content was then less than 1% by weight, based on dispersed polymer, and comprised:

| |
|---|
| 30 mg of vinyl acetate/kg of emulsion |
| <10 mg of ethyl acrylate/kg of emulsion |
| 8 mg of formaldehyde/kg of emulsion. |

We claim:

1. A process for preparing an aqueous polymer emulsion, comprising:
  modifying an aqueous polymer emulsuion comprising at least one unpolymerized monomer in an amount ranging from greater than 0 to 1% by weight, based on the polymer content in the emulsion, said unpolymerized monomer containing at least one ethylenically unsaturated double bond by combining said aqueous polymer emulsion with a free radical redox initiator system comprising at least one oxidizing agent and at least one reducing agent, wherein the reducing agent comprises aminoiminomethanesulfinic acid or a salt thereof and reducing the amount of said unpolymerized monomer present in said aqueous polymer emulsion.

2. A process as claimed in claim 1, wherein said unpolymerized monomer content to be reduced is from >0 to ≦0.5% by weight.

3. A process as claimed in claim 1, wherein said unpolymerized monomer content to be reduced is from >0 to ≦0.1% by weight.

4. A process as claimed in claim 1, wherein the polymer contains, incorporated in chemically bonded form, at least two monomeric units which differ from one another and have at least one ethylenically unsaturated group.

5. A process as claimed in claim 4, wherein the polymer contains, incorporated in chemically bonded form, at least two monomeric units which differ from one another and have at least one ethylenically unsaturated group and, on the other hand, the ratio $S_A/S_B$ is $\leq 1.1$, where $S_A$ is the molal solubility, determined at 25° C. and 1 bar, of that monomer of the residual monomer mixture whose content is to be reduced which has the highest molal solubility in water under these conditions and $S_B$ is the corresponding solubility of that monomer of the residual monomer mixture whose content is to be reduced which has the lowest molal solubility in water under these conditions.

6. A process as claimed in claim 5, wherein $S_A/S_B$ is $\geq 1.5$.

7. A process as claimed in claim 1, wherein the unpolymerized monomer comprises at least one monomer selected from the group consisting of styrene, butadiene, n-butyl acrylate and 2-ethylhexyl acrylate and at least one other monomer selected from the group consisting of acrylic acid, methacrylic acid, acrylamide and methacrylamide.

8. A process as claimed in claim 1, wherein the unpolymerized monomer comprises acrylonitrile.

9. A process as claimed in claim 1, wherein the unpolymerized monomer comprises vinyl acetate or vinyl propionate.

10. A process as claimed in claim 1, wherein the unpolymerized monomer comprises acrylic acid.

11. A process as claimed in claim 1, wherein the solids volume content of the aqueous polymer emulsion is from 30 to 70% by volume.

12. A process as claimed in claim 1, wherein the polymer is prepared in the presence of substances which are sources of free formaldehyde.

13. A process as claimed in claim 1, wherein the redox initiator system acts at a pH of the aqueous dispersing medium of from 6 to 10.

14. A process as claimed in claim 1, wherein the redox initiator system acts at from 50° to 80° C.

15. A process as claimed in claim 1, wherein molecular oxygen is a component of the redox initiator system.

16. A process as claimed in claim 1, wherein the redox initiator system acts at a temperature above the minimum film formation temperature of the resulting aqueous polymer emulsion.

17. A process as claimed in claim 1, wherein the redox initiator system acts at a temperature above the statistical glass transition temperature of the dispersed polymer.

18. A process as claimed in claim 1, wherein the aqueous polymer emulsion is a secondary emulsion.

19. A process as claimed in claim 1, wherein the polymer is prepared from at least one monomer which contains an ethylenically unsaturated double bond by a free radical aqueous emulsion polymerization method.

20. A process as claimed in claim 19, wherein the free radical aqueous emulsion polymerization is carried out by the feed method.

21. A process as claimed in claim 20, wherein from 50 to 100% by weight of the monomers to be polymerized are added to the polymerization vessel from the beginning of the free radical aqueous emulsion polymerization.

22. A process as claimed in claim 19, wherein at least 50% by weight of the monomers to be polymerized are polymerized in the absence of aminoiminomethanesulfinic acid.

23. A process as claimed in claim 19, wherein the free radical initiator system used for the preparation of the polymer comprises peroxodisulfuric acid or an alkali metal salt thereof.

24. A process as claimed in claim 19, wherein exclusively peroxodisulfuric acid or an alkali metal salt thereof or the ammonium salt thereof or the ammonium salt is used as the free radical initiator system for the preparation of the polymer.

25. A process as claimed in claim 19, wherein a polymerization temperature of from 70° to 100° C. is used for the preparation of the polymer.

26. A process as claimed in claim 19, wherein the monomer composition to be polymerized for the preparation of the polymer comprises at least two monomers which differ from one another and have at least one ethylenically unsaturated group and additionally contains from 70 to 99.9% by weight of esters of acrylic or methacrylic acid with alkanols of 1 to 12 carbon atoms or styrene; or from 70 to 99.9% by weight of styrene or butadiene; or from 70 to 99.9% by weight of vinyl chloride or vinylidene chloride; or from 40 to 99.9% by weight of vinyl acetate, vinyl propionate or ethylene.

27. A process as claimed in claim 1, wherein a peroxide or a hydroperoxide is concomitantly used as the oxidizing agent of the free radical redox initiator system.

28. A process as claimed in claim 1, wherein tert-butyl hydroperoxide is concomitantly used as the oxidizing agent.

29. A process as claimed in claim 1, wherein the free radical redox initiator system also comprises a metal compound which is soluble in the aqueous reaction medium and whose metallic component occurs in a plurality of valency states.

30. A method of using a free radical redox initiator system which comprises, as the reducing agent, aminoiminomethanesulfinic acid or a salt thereof, for reducing the content of free monomers, which are not chemically bonded and have at least one ethylenically unsaturated double bond, in an aqueous polymer emulsion, said content being from >0 to ≦1% by weight, based on the polymer content of the aqueous polymer emulsion.

* * * * *